United States Patent
Choe et al.

(10) Patent No.: US 7,277,383 B2
(45) Date of Patent: Oct. 2, 2007

(54) REDUNDANCY MECHANIZATION PROTOCOL FOR A MASSIVELY PARALLEL ROUTER

(75) Inventors: Myongsu Choe, Montreal (CA); Jack C. Wybenga, Plano, TX (US); Pradeep Samudra, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1031 days.

(21) Appl. No.: 10/193,355

(22) Filed: Jul. 11, 2002

(65) Prior Publication Data

US 2003/0067924 A1     Apr. 10, 2003

Related U.S. Application Data

(60) Provisional application No. 60/327,494, filed on Oct. 5, 2001, provisional application No. 60/327,230, filed on Oct. 5, 2001.

(51) Int. Cl.
*H04L 12/26* (2006.01)
*H04L 12/66* (2006.01)
*H04L 12/28* (2006.01)

(52) U.S. Cl. ............ 370/219; 370/356; 370/389; 370/392; 370/395.31; 370/400

(58) Field of Classification Search ............ None
See application file for complete search history.

(56) References Cited

U.S. PATENT DOCUMENTS

| | | | |
|---|---|---|---|
| 6,049,524 A * | 4/2000 | Fukushima et al. ......... 370/220 |
| 6,275,492 B1 * | 8/2001 | Zhang ......................... 370/392 |
| 6,577,634 B1 * | 6/2003 | Tsukakoshi et al. ... 370/395.31 |
| 6,580,715 B1 * | 6/2003 | Bare ............................ 370/396 |
| 6,823,395 B1 * | 11/2004 | Adolfsson .................. 709/242 |
| 6,876,625 B1 * | 4/2005 | McAllister et al. ......... 370/221 |
| 6,973,023 B1 * | 12/2005 | Saleh et al. ................. 370/217 |

FOREIGN PATENT DOCUMENTS

EP        0 969 630 A1     1/2000

OTHER PUBLICATIONS

J. Moy et al., "OSPF Version 2", Proteon, Inc., IETF Standard, Internet Engineering Task Force, Mar. 1994, 131 pages.

* cited by examiner

*Primary Examiner*—Chi Pham
*Assistant Examiner*—Melanie Jagannathan (57) ABSTRACT

A parallel router comprising: 1) a plurality of routing nodes, each of the plurality of routing nodes capable of receiving message packets from and transmitting message packets to external devices, wherein the each of the plurality of routing nodes maintains a routing table suitable for routing message packets from transmitting ones of the plurality of routing nodes to receiving ones of the plurality of routing nodes; and 2) a switch fabric capable of transmitting the messages packets between the transmitting nodes and the receiving nodes, wherein a designated one of the plurality of routing nodes is operable to transmit to at least one non-designated one of the plurality of routing nodes a hello request message operable to cause the non-designated routing node to transmit back a hello acknowledgment message, wherein the designated routing node monitors a time duration between transmission of the hello request message and receipt of the hello acknowledgment message to determine if the non-designated routing node has failed.

20 Claims, 7 Drawing Sheets

REDUNDANCY MECHANIZATION PROTOCOL FOR A MASSIVELY PARALLEL ROUTER

The present invention claims priority to U.S. Provisional Application Ser. No. 60/327,494, which was filed on Oct. 5, 2001, and to U.S. Provisional Application Ser. No. 60/327,230, which was filed on Oct. 5, 2001.

CROSS-REFERENCE TO RELATED APPLICATIONS

The present invention is related to those disclosed in the following United States Patent Applications:

1) Provisional Patent Application Ser. No. 60/327,494, filed Oct. 5, 2001, entitled "A ROUTING COORDINATION PROTOCOL FOR LOOSELY COUPLED MASSIVELY PARALLEL ROUTER;"
2) Provisional Patent Application Ser. No. 60/327,230, filed Oct. 5, 2001, entitled "REDUNDANCY MECHANIZATION PROTOCOL FOR A MULTI-GIGABIT SWITCHING ROUTER;" and
3) patent application Ser. No. 10/193,426, filed concurrently herewith, entitled "ROUTING COORDINATION PROTOCOL FOR A MASSIVELY PARALLEL ROUTER ARCHITECTURE."

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to massively parallel routers and, more specifically, to a redundance mechanization protocol for use in a massively parallel router.

BACKGROUND OF THE INVENTION

The explosive growth of Internet traffic has been caused by the increased number of Internet users, various service demands from those users, the implementation of new services, such as voice-over-IP (VoIP) or streaming applications, and the development of mobile Internet. Conventional routers, which act as relaying nodes connected to subnetworks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Thus, routers are increasingly blamed for major bottlenecks in the Internet.

Early routers were implemented on a computer host so that the CPU of the host performed all managerial tasks, such as packet forwarding via a shared bus and routing table computation. This plain architecture proved to be inefficient, due to the concentrated overhead of the CPU and the existence of congestion on the bus. As a result, router vendors developed distributed router architectures that provide efficient packet processing compared to a centralized architecture. In a distributed router architecture, many of the functions previously performed by the centralized CPU are distributed to the line cards and the shared bus is replaced by a high-speed crossbar switch.

Figure 1:
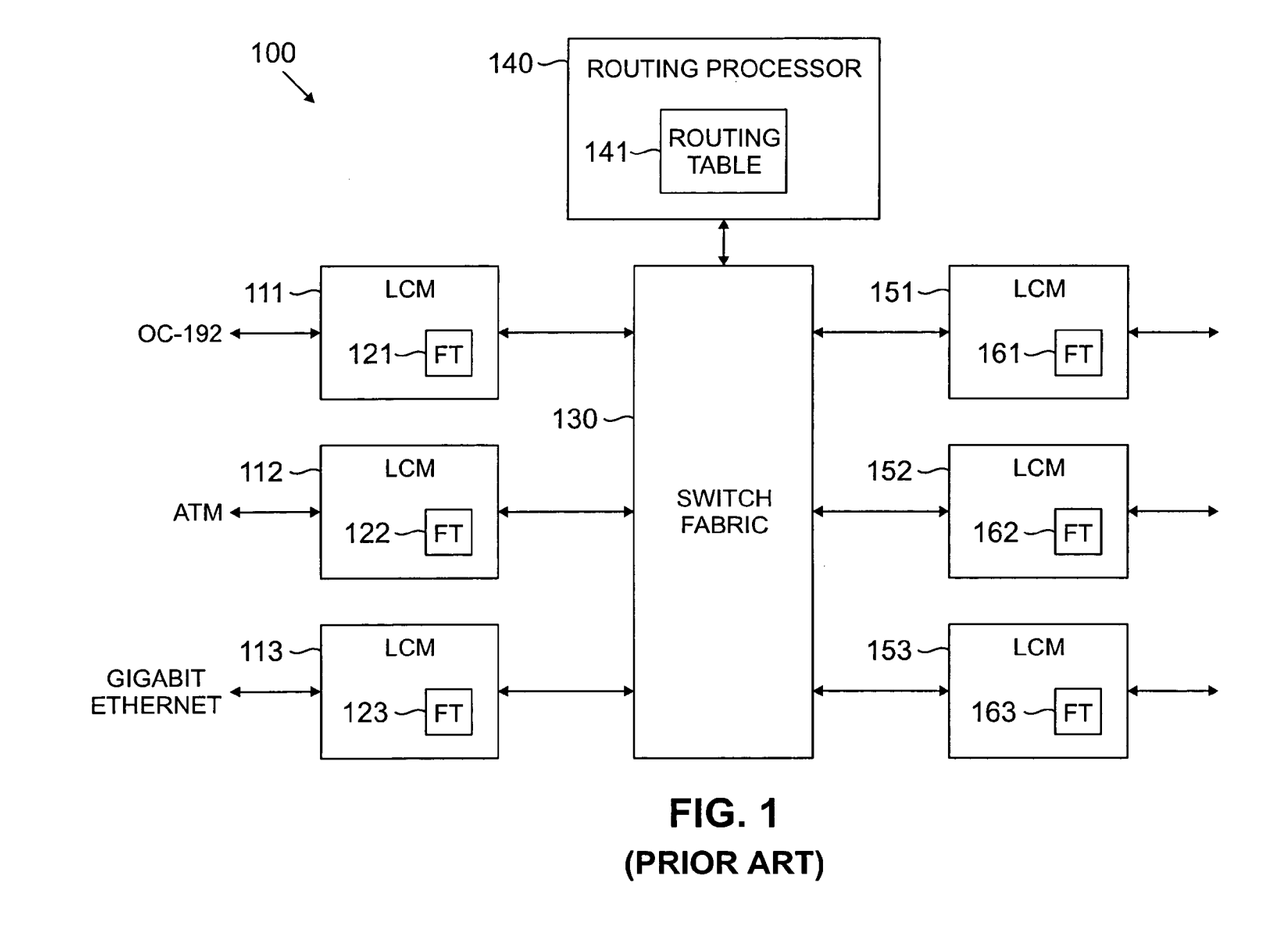
FIG. 1 illustrates a distributed router architecture according to an exemplary embodiment of the prior art.

FIG. 1 illustrates distributed router 100 according to an exemplary embodiment of the prior art. Distributed router 100 interfaces with different types of networks in FIG. 1, including optical networks (OC-192), asynchronous transfer mode (ATM) networks, and Gigabit Ethernet as network interfaces, among others (not shown). Distributed router 100 comprises line card modules (LCMs) 111-113, switch fabric 130, routing processor 140, and line card modules (LCMs) 151-153. LCM 111, LCM 112, and LCM 113 contain forwarding table (FT) 121, forwarding table (FT) 122, and forwarding table (FT) 123, respectively. Similarly, LCM 151, LCM 152, and LCM 153 contain forwarding table (FT) 161, forwarding table (FT) 162, and forwarding table (FT) 163, respectively.

Packets coming from adjacent router(s) or subnetworks are received by line card modules 111-113 and line card modules 151-153 and sent to switch fabric 130. Switch fabric 130 switches packets coming from or going to line card modules 111-113 and 151-153 and plays an essential role in relaying packets.

Routing processor 140 builds routing table 141 and maintains the current status of routing table 141 by updating changed routes immediately. Routing processor 140 maintains routing table 141 by running a routing protocol, such as Routing Information Protocol (RIP), Open Shortest Path First (OSPF), or Border Gateway Protocol (BGP). Forwarding tables 121-123 and 161-163 support an efficient lookup in each line card and are downloaded from routing table 141 of routing processor 140. If an incoming packet from a line card module cannot find its destination path from the forwarding table, the corresponding packet may be passed through switch fabric 130 toward a pre-defined default route, or may be silently discarded at the line card.

The main reason for router manufacturers to favor distributed architecture is the simplicity of using a centralized processor to manage one routing table in a consistent way. On the other hand, although the separation of routing and forwarding functions enables high-speed packet processing, the introduction of QoS-capable routing service and the route delays caused by network instability demand even greater packet processing capacity, thereby resulting in additional overhead for the routing processor or instability in the router itself.

A large number of small routers can operate in concert (i.e., in parallel), if an efficient set of interoperability rules are established. The industry has avoided this coordination problem by using a single routing server to handle the routing problems. Therefore, it bounds both the scale of the router and its maximum performance to the scale of available microprocessor processing capacity.

Therefore, there is a need in the art for an improved massively parallel router. In particular, there is a need for a massively parallel router having a distributed architecture that implements an efficient packet routing protocol without bounding the router and its maximum performance to the scale of available microprocessor processing capacity.

SUMMARY OF THE INVENTION

A loosely-coupled unified environment (LUE) routing coordination protocol according to the principles of the present invention is designed to reduce the traffic among routing nodes (RNs) in a virtual area in which heavy traffic might result. The present invention proposes several unique improvements as follows. An Open Shortest Path First (OSPF) intra-domain routing protocol allows collections of contiguous networks and hosts to be grouped together. Such a group, together with the distributed routing architecture having interfaces to any one of the included networks is called an area. The topology of an area is invisible from the outside of the area. Router nodes internal to a given area know nothing of the detailed topology external to the area. This isolation of knowledge enables the proposed LUE protocol to effect a marked reduction in routing traffic as compared to treating the entire autonomous system as a single link state domain. Routing nodes belonging to the same area have an identical area link-state database.

The routing node protocol support must include an ability to aggregate contiguous collections of IP class A, B, or C network numbers into larger quantities of supernets. In order to reduce the number of summary-link state advertisement (LSA) packets in the system, each RN aggregates its routing entries and sends them to a designated routing node (DRN). A flooding scheme is an expensive one for exchanging LSA packets. Each RN can access the other RNs through switch fabric. In this scheme, when there exists N routing nodes, the message complexity of the flooding scheme is equal to $O(N^2)$. The parallel router architecture implements a star topology to reduce the message traffic to $O(N)$ by assigning two switch processors (SWPs) to a DRN and a backup DRN, thereby competing with the complexity of the centralized routing and distributed forwarding router architecture shown in FIG. 1.

To reduce control messages required to determine the Designated (or Backup) IOP or SWP among the routing nodes, at system initialization, the DRN and Backup DRN are chosen without competition in which the SWP with the smallest IP address is elected as DRN, thereby resulting in message complexity $O(1)$ instead of $O(N^2)$.

To address the above-discussed deficiencies of the prior art, it is a primary object of the present invention to provide an improved distributed router. According to an advantageous embodiment of the present invention, the parallel router comprises: 1) a plurality of routing nodes, each of the plurality of routing nodes capable of receiving message packets from and transmitting message packets to external devices, wherein the each of the plurality of routing nodes maintains a routing table suitable for routing message packets from transmitting ones of the plurality of routing nodes to receiving ones of the plurality of routing nodes; and 2) a switch fabric capable of transmitting the messages packets between the transmitting nodes and the receiving nodes, wherein a designated one of the plurality of routing nodes is operable to transmit to at least one non-designated one of the plurality of routing nodes a hello request message operable to cause the non-designated routing node to transmit back a hello acknowledgment message, wherein the designated routing node monitors a time duration between transmission of the hello request message and receipt of the hello acknowledgment message to determine if the non-designated routing node has failed.

According to one embodiment of the present invention, the designated routing node transmits an aggregated LSA message packet to the at least one non-designated routing node if the time duration does not exceed a predetermined maximum threshold.

According to another embodiment of the present invention, the designated routing node is operable to broadcast to each non-designated one of the plurality of routing nodes a hello request message operable to cause the each non-designated routing node to transmit back a hello acknowledgment message, wherein the designated routing node monitors, for the each non-designated routing node, a time duration between transmission of the hello request message and receipt of the hello acknowledgment message to determine if the each non-designated routing node has failed.

According to still another embodiment of the present invention, the designated routing node transmits an aggregated LSA message packet to the each non-designated routing node if the time duration does not exceed a predetermined maximum threshold.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 2 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged parallel router.

Figure 2:
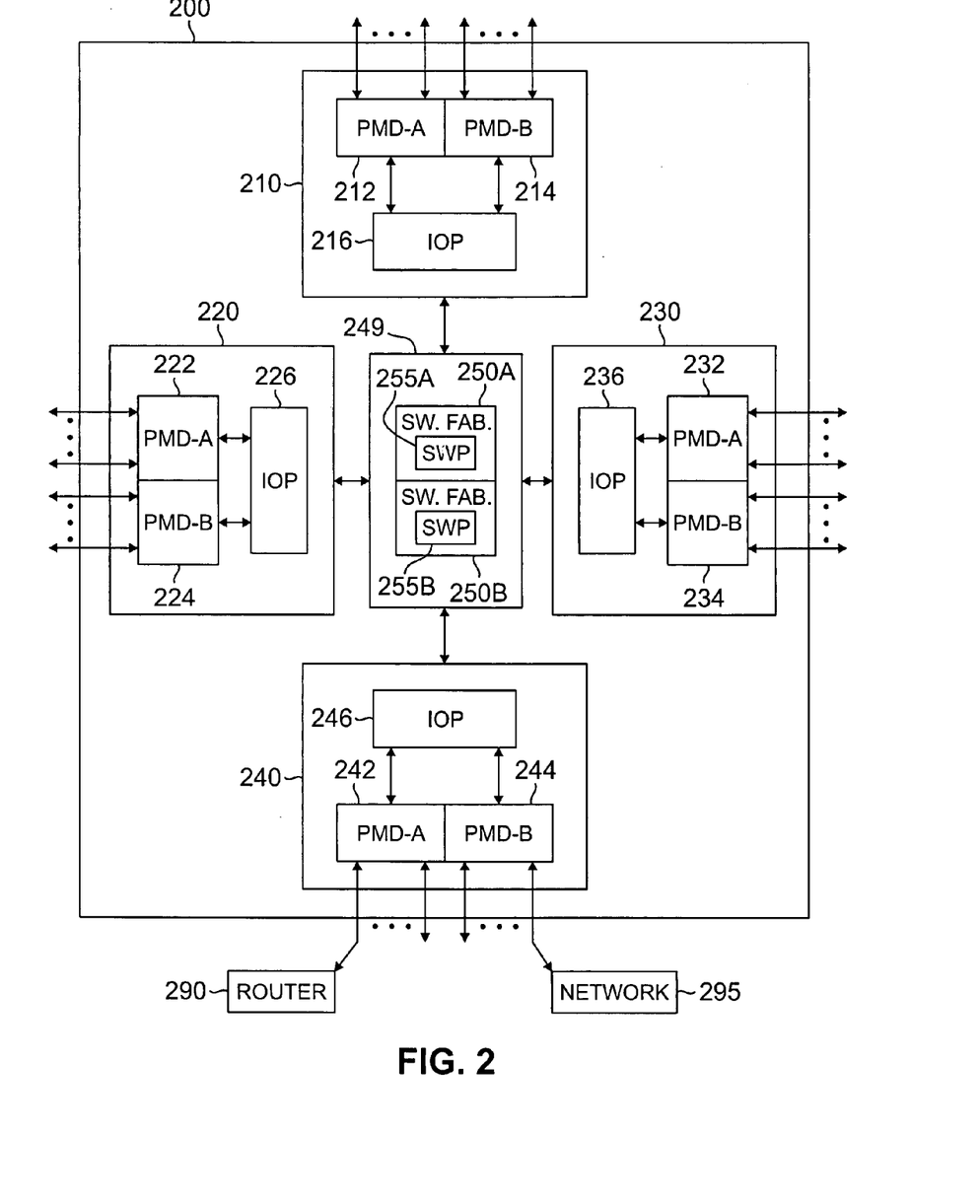
FIG. 2 illustrates a massively parallel router architecture using an improved coordination protocol according to the principles of the present invention.

FIG. 2 illustrates parallel router architecture 200, which uses an improved routing coordination protocol according to the principles of the present invention. Parallel router architecture 200 provides scalability and high-performance using up to N independent routing nodes (RN), including exemplary routing nodes 210, 220, 230 and 240, connected by switch 249, which comprises a pair of high-speed switch fabrics 250A and 250B. Each routing node comprises an input-output processor (IOP), and one or more physical medium devices (PMDs). Exemplary RN 210 comprises PMD 212 (labeled PMD-A), PMD 214 (labeled PMD-B), and IOP 216. RN 220 comprises PMD 222 (labeled PMD-A), PMD 224 (labeled PMD-B), and IOP 226. RN 230 comprises PMD 232 (labeled PMD-A), PMD 234 (labeled PMD-B), and IOP 236. Finally, exemplary RN 240 comprises PMD 242 (labeled PMD-A), PMD 244 (labeled PMD-B), and IOP 246.

Each one of IOP 216, IOP 226, IOP 236, and IOP 246 buffers incoming Internet protocol (IP) packets from subnets or adjacent routers, such as router 290 and network 295. Each one of IOP 216, IOP 226, IOP 236, and IOP 246 also classifies requested services, looks up destination addresses from packet headers, and forwards packet to the outbound IOP. Moreover, each IOP also maintains an internal routing table determined from routing protocol packets and computes the shortest data paths from the routing table. Each IOP processes an incoming packet from one of its PMD modules. According to one embodiment of the present invention, each PMD card frames an incoming packet (or cell) from an IP network (or ATM switch) to be processed in an IOP and performs bus conversion functions.

Each one of routing nodes 210, 220, 230, and 240, configured with an IOP and PMD(s) and linked by switch fabrics 250A and 250B, is essentially equivalent to a router by itself. The present invention proposes a generic and scalable router architecture comprised of multiple RNs connected by high-speed switch fabrics 250A and 250B.

Thus, parallel router architecture 200 can be considered a set of RN building blocks with high-speed links connected to each block. Switch processors, such as exemplary switch processors (SWP) 255A and 255B, located in switch fabrics 250A and 250B, respectively, support system management as well as packet switching between IOPs. Parallel router architecture 200 can be constructed by using available off-the-shelf commodities on the market, thereby resulting in cost competitiveness, flexibility, resiliency, and scalability by attaching each building block to the switch fabric.

Unlike a traditional router, parallel router architecture 200 is required to have an efficient mechanism of monitoring the activity (or "aliveness") of each routing node 210, 220, 230, and 240. The present invention introduces a novel routing coordination protocol, called a loosely-coupled unified environment (LUE) protocol, which can be used to connect all of the independent routing nodes to act as a single router by maintaining a consistent link-state database for each routing node. The loosely-unified environment (LUE) protocol is based on the design concept of OSPF (Open Shortest Path First) routing protocol and is executed in parallel by daemons in each one of RN 210, 220, 230, and 240 and in SWP 255A and SWP 255B to select a designated RN among RN 210, 220, 230, and 240 and to synchronize whole routing tables. As is well known, a daemon is an agent program which continuously operates on a processing node and which provides resources to client systems. Daemons are background processes used for handling low-level operating system tasks. For an efficient implementation, a designated RN is assigned to a master SWP and a backup designated RN to a backup SWP during the system initialization.

Figure 3:
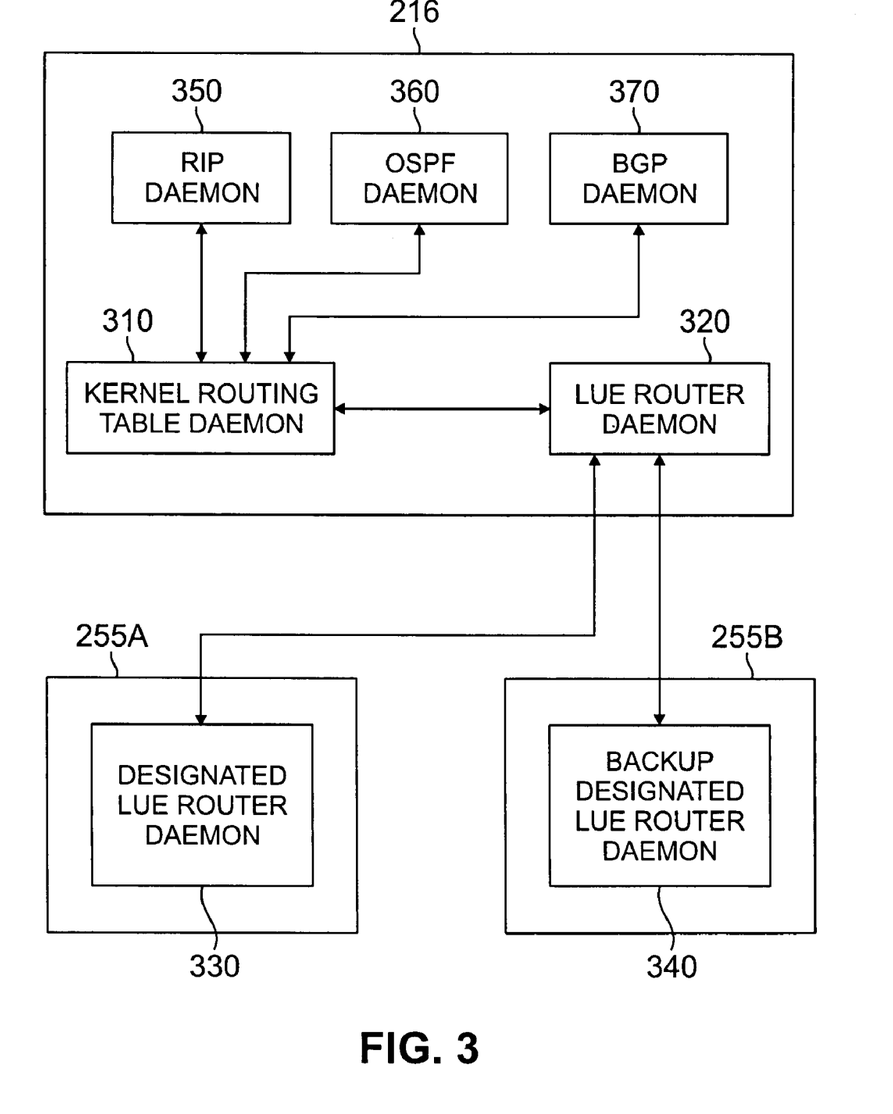
FIG. 3 illustrates the interactions of software modules in the input-output processors (IOPs) of the routing nodes and in the switch processor (SWP) according to the principles of the present invention.

FIG. 3 illustrates the interactions of software modules in the input-output processors (IOPs) of the routing nodes and in the switch processors (SWPs) according to the principles of the present invention. Assuming that RN 210 (or IOP 216), RN 220 (or IOP 226), RN 230 (or IOP 236), and RN 240 (or IOP 246), and SWP 255A and SWP 255B are initialized and kept alive, LUE router daemon 320, designated LUE router daemon 330, and backup designated LUE router daemon 340 are run at respective routing nodes, such as RN 216, designated (or primary) SWP 255A, and backup SWP 255B. Changed route entries caused by the operation of a LUE router daemon, such as designated LUE router daemon 320, are reflected to a kernel routing table by a kernel routing table daemon, such as kernel routing table daemon 310.

In each of IOP 216, IOP 226, IOP 236, and IOP 246, routing daemons, such as Routing Information Protocol (RIP) daemon 350, Open Shortest Path First (OSPF) daemon 360, and Border Gateway Protocol (BGP) daemon 370, exchange routing information via kernel routing table daemon 310. LUE router daemon 320 in IOP 216 has a connection to kernel routing table daemon 310 via, for example, socket communication. Each system processor located in designated SWP 255A and backup SWP 255B must have consistent routing information collected from each LUE daemon at each IOP. To ensure this is true, each one of LUE router daemons 320, 330 and 340 has a consistent link-state database (LSDB) maintained by the designated LUE router daemon.

Unlike other routing software modules, each LUE router daemon does not maintain its own routing table because it only performs routing coordination and synchronization among routing tables at IOPs. This enables all the IOPs to have a globally consistent routing table as if all the IOPs are apparently working as one router in terms of the view of a user.

RNs and SWPs are connected in a broadcast network. During the system initialization, two SWPs are assigned to a designated routing node (DRN) and a backup designated routing node (non-DRN), respectively. Otherwise, an election algorithm like that used in an OSPF routing protocol demands $O(N^2)$ message complexity in a point-to-point network and $O(N)$ in a broadcast or an NBMA (non-broadcast multi-access) network where N is the number of routing nodes. In the present invention, the message complexity is reduced to just $O(1)$.

Figure 4:
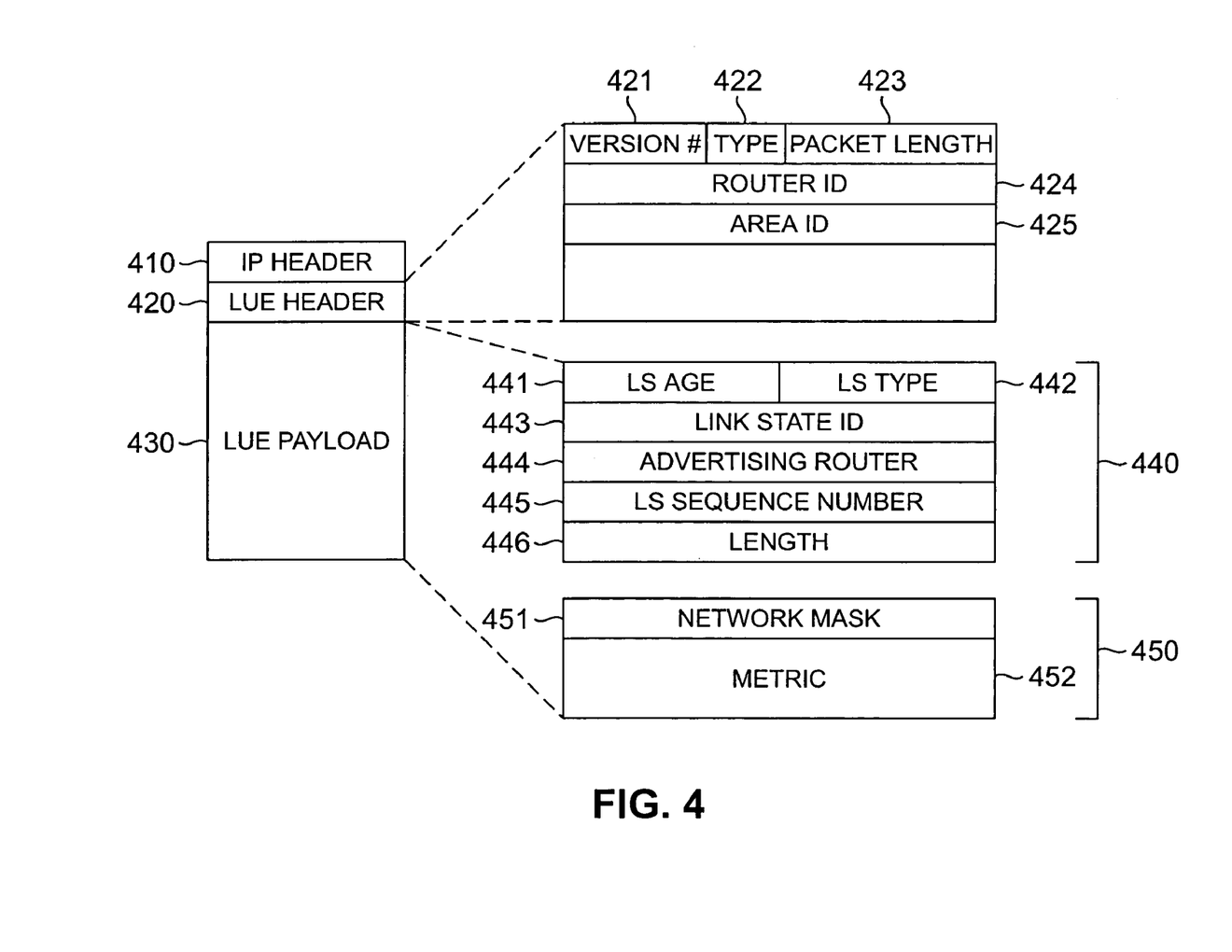
FIG. 4 is an illustration of a loosely-coupled unified environment (LUE) packet according to an exemplary embodiment of the present invention.

FIG. 4 is an illustration of a loosely-coupled unified environment (LUE) packet according to an exemplary embodiment of the present invention. The LUE packet runs directly over the IP network layer (represented by IP header 410), as in the case of an OSPF protocol, and does not require the services of UDP or TCP protocols. When routing node receives an IP packet with IP protocol number=99, in which it can be reserved for another proprietary protocol, the routing node determines that the packet contains a LUE payload. Stripping off its IP header 410, the routing node identifies a LUE packet comprising LUE header 420 and LUE payload 430.

LUE header 420 contains all of the information necessary to determine whether the packet should be accepted for further processing as specified in the header format. LUE header 420 comprises Version# field 421, type field 422, packet length field 423, router identification (ID) field 424, and area identification (ID) field 425. Version# field 421 contains the LUE protocol version number. If Type field 422 is set to a value of 1, then the LUE packet is a "Hello" packet. If Type field 422 is set to a value of 2, then the LUE packet is a database description (DD) packet. Packet length field 423 contains the length of the LUE protocol packet in bytes. This length includes LUE header 420. Router (e.g., IOP or SWP) ID field contains the ID of the IOP or SWP that is the source of the LUE packet. Area ID field 425 is a 32-bit number identifying the virtual area to which the LUE packet belongs. The virtual backbone areas have an Area ID field 425 of "0.0.0.0".

A database description (DD) packet is sent from an IOP to the Designated SWP when a routing table managed by kernel routing table daemon 310 is changed due to packets coming from an external connection of the corresponding IOP. Otherwise, the Designated SWP periodically (or in an event-driven manner) broadcasts a link state advertisement (LSA) message to the active IOPs. The DD packet also describes the contents of the link-state database. Multiple DD packets may be used to describe the whole database, but only one aggregated DD packet, if possible, is sent from the IOP to the Designated SWP, and vice versa.

The LUE router protocol depends upon IP fragmentation when transmitting packets larger than the network Maximum Transmission Rate (MTU). The length of a LUE packet may be up to 65,535 bytes, including IP header 410. The LUE protocol uses IP protocol number 99. For the purpose of the synchronizing routing tables located at each IOP, the present invention uses a database description packet in which Type field 422 is set to a value of 2.

Each link state advertisement message describes a piece of the LUE router domain. All LSA messages are sent on a point-to-point basis from the normal LUE daemons at IOPs to the Designated SWP LUE router daemon. The collection of LSAs at the Designated LUE router daemon is called the link-state database. The Designated LUE router daemon periodically broadcasts its aggregated LSA packet to the normal LUE router daemon located at each IOP.

LUE payload 430 can be further decomposed into two parts: LSA header 440 and LSA body 450. The LUE protocol may omit checksum and authentication fields for efficiency. LSA header 440 is a standard 20 byte header. LUE header 440 comprises link state (LS) age field 441, link state type field 442, link state identification (ID) field 443, advertising router field 444, LS sequence number field 445, and length field 446. The header contains enough information to uniquely identify the LSA. The LS age and LS is sequence number fields are used to determine which instance is more recent.

LS age field 441 contains the time in seconds since the LSA was originated. LS type field 442 contains a value identifying the type of the LSA message (e.g., 1=Router-LSA, 2=Network-LSA, 3=Summary-LSA). Link state ID field 443 identifies the portion of the Internet environment that is being described by the LSA message. In this case the link state ID is an IP network number. Advertising router field 444 contains the IOP or SWP ID of the IOP or SWP that originated the LSA message. LS sequence number field 445 is used to detect old or duplicate LSAs. Successive instances of an LSA are given successive LS sequence numbers. Length field 446 contains the length in bytes of the LSA message.

LUE body 450 comprises network mask field 451 and metric field 452. Network mask field 451 indicates the destination network's IP address mask. For example, when advertising the location of a class A network the value 0xff000000 may be used. Metric field 452 identifies the "cost" of this route. The value is expressed in the same units as the interface costs in the router-LSA in an OSPF protocol.

Figure 5:
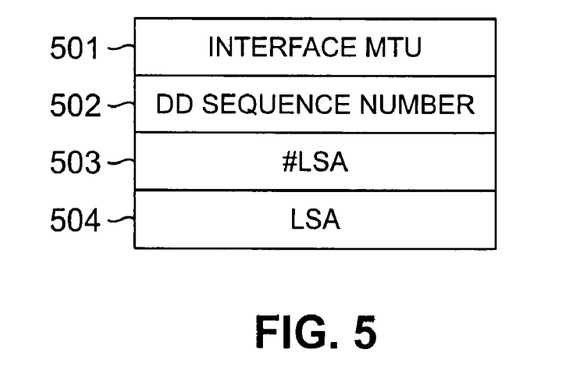
FIG. 5 is an illustration of a Database Description (DD) packet according to an exemplary embodiment of the present invention.

FIG. 5 is an illustration of a database description (DD) packet according to an exemplary embodiment of the present invention. The DD packet comprises interface MTU field 501, database description sequence number field 502, #LSA field 503, and LSA field 504. Interface MTU field 501 contains the number of bytes of the largest IP datagram that can be sent out to the associated interface without fragmentation. DD sequence number field 502 is used to sequence the collection of database description packets. The initial value should be unique. Then, DD sequence number field 502 increments until the complete database description has been sent. #LSA field 503 contains the number of LSAs included in the route reflection. Finally, link state advertisement (LSA) field 504 comprises the remainder of the DD packet and consists of an aggregated (possibly partial) list of the link-state database pieces, in which each LSA depicting its own link state database at the corresponding IOP is represented by a summary-LSA packet.

The LUE router daemon only uses a type-3 summary-LSA. Aggregated routes from the kernel routing table daemon at each IOP are contained into the type-3 summary-LSA format. In addition, the aggr_lsa packet broadcasted from the Designated LUE router daemon in FIG. 7 has the same LSA packet format in the DD packet. When describing Default summary route, the summary-LSA's Link State ID is always set to Default Destination (0.0.0.0) and the Network Mask is set to 0.0.0.0.

Figure 6:
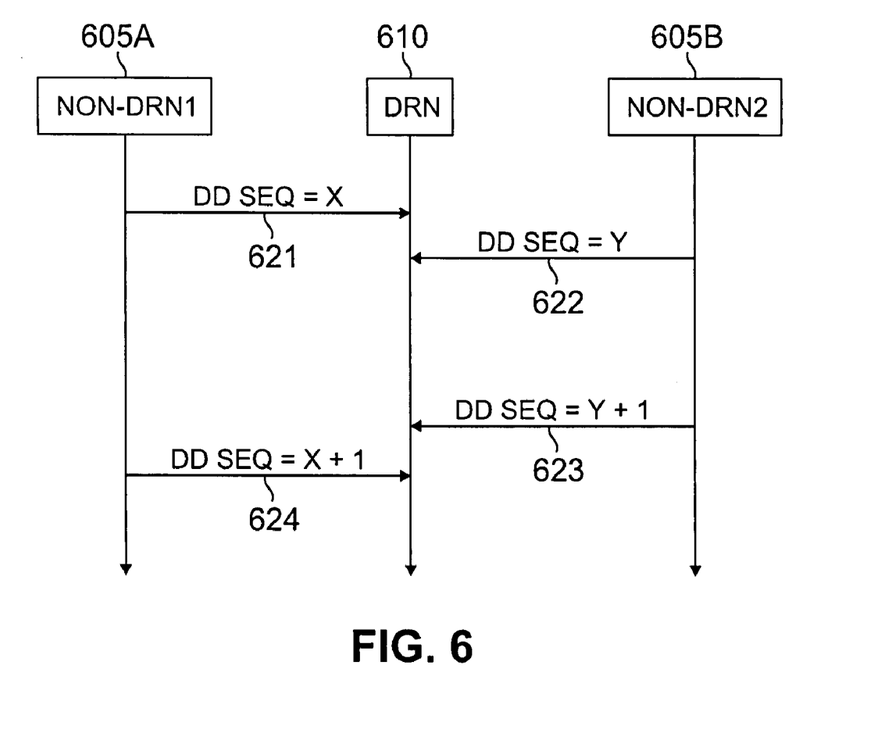
FIG. 6 is a message flow diagram of DD packets forming LSA packets exchanged between a designated routing node (DRN) and a non-designated routing node (non-DRN) according to an exemplary embodiment of the present invention.

FIG. 6 is a message flow diagram of DD packets forming LSA packets exchanged between a designated routing node (DRN) and non-designated routing nodes (non-DRNs) according to an exemplary embodiment of the present invention. To provide a reliable LSDB (link-state database) exchange among RNs in a virtual area, it is assumed that the network links connecting DRN 610 with non-DRN 605A (labeled NON-DRN1) and non-DRN 605B (labeled NON-DRN2) are reliable. If non-DRN 605A receives aggregated route entries from kernel routing table daemon 310, non-DRN 605A responds by sending database description (DD) packets with DD sequence number=X to the Designated LUE router daemon at DRN 610 (message 621). If non-DRN 605B receives aggregated route entries from kernel routing table daemon 310, non-DRN 605B responds by sending database description (DD) packets with DD sequence number=Y to the Designated LUE router daemon at DRN 610 (message 622).

After receiving DD packets containing the summary-LSA message, DRN 610 keeps it in its own LSDB. If non-DRN 605B receives additional aggregated route entries from kernel routing table daemon 310, non-DRN 605B responds by sending DD packets with summary-LSA with the sequence number=Y+1 to DRN 610 (message 623). If non-DRN 605A receives additional aggregated route entries from kernel routing table daemon 310, non-DRN 605A responds by sending DD packets with summary-LSA with the sequence number=X+1 to DRN 610 (message 624).

To reduce the number of LSAs between DRN and non-DRN, an LSA header and an LSA payload in the DD packet are aggregated from the routing table managed by the kernel routing table daemon at the corresponding RN. When a DD packet with aggregated LSA(s) arrives at a DRN, the LSA messages are updated in the LSDB of the DRN. The Designated LUE router daemon at the DRN periodically broadcasts its aggregated routes in the form of DD packets with summary-LSA payload (called "aggr_LSA") to the non-DRNs.

Figure 7:
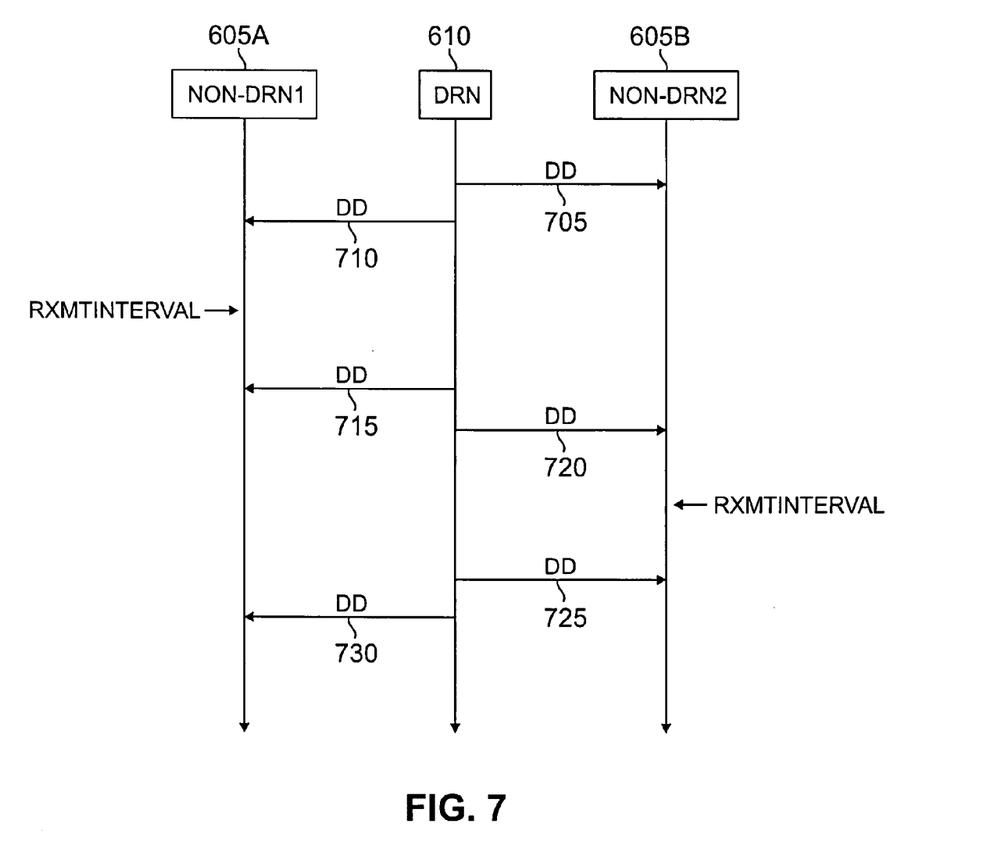
FIG. 7 is a message flow diagram of DD packets forming LSA packets with a summary-LSA sent from the designated routing node (DRN) to the non-designated routing nodes (non-DRNs) according to an exemplary embodiment of the present invention.

FIG. 7 is a message flow diagram of the broadcasting of aggregated LSA packets in DD packets with a summary-LSA from the designated routing node (DRN) to the non-designated routing nodes (non-DRNs) according to an exemplary embodiment of the present invention. The aggregated LSA packets (aggr_LSA) in messages 705, 710, 715, 720, 725, and 730 are broadcast over a finite time period called RxmtInterval. When an aggr-LSA packet is received from DRN 610, the LUE router daemon 320 at each non-DRN 605A, 605B bypasses it to kernel routing table daemon 310, where it updates the routing table and reflects all of the route changes in the IOPs.

Under normal circumstances of an OSPF protocol, every LSA in the link-state database is updated at least once every periodic interval (e.g., one every 30 minutes). In an LSA that has not been updated after the interval, the LSA is assumed to be no longer valid and is removed from the database. LS Age field 441 indicates the length of elapsed time since the LSA was last updated. All of the LSAs in the link-state database located at the Designated RN are kept until they are expired. When an LS at the DRN is purged from the LS database due to its expiration, an LSA message is broadcast to the all of the non-DRNs to ensure that all RNs remove the LSA at approximately the same time, without depending upon a synchronized clock. Then, all of other non-DRNs remove LSAs matching the LSA with "MaxAge" being broadcast by the DRN from their database copies to reduce the occupied memory and computational workload.

A network multicast capability allows an application to send a single datagram that will be delivered to multiple recipients. Applications exhibiting one-to-many and many-to-many communication patterns, such as multi-person teleconferencing, video conferencing, distance learning, distributed interactive simulation, and bulk transfer of the same set of data to a large number of recipients, find multicast extremely useful. A host can join and leave multicast groups dynamically using the Internet Group Membership Protocol (IGMP) to keep the multicast-capable routers informed of the current membership status of the host. In the present invention, each RN receiving a group-membership LSA message sends it to the DRN and then the DRN broadcasts the corresponding LSA message to the rest of the RNs to share the consistent link-state database.

The present invention is implemented as a scalable high-performance. router that can easily be customized to any routing capacities by varying the number of autonomous routers connected to a high-speed switch. The present invention also introduces a novel redundancy mechanization protocol in which can be used to connect all of the independent routers as a single router conceptually and to monitor failed IOPs by exchanging status packets between IOPs and the SWPs, based on the basic concepts of BGP and OSPF routing protocols.

Redundancy of routing elements is conventionally provided on a 1:1 or 1:N basis by sending some form of health status packets to determine if an element has failed and then using previously stored state information to switch to a redundant component. The present invention proposes a method where a high performance variant of a standard routing protocol, LUE, sends presence packets at a sufficiently high rate to indicate the loss of a resource. If an alternate path exists, albeit at a higher cost metric, the traffic is then routed to the alternate paths as part of the normal internal routing protocol.

To bring up adjacencies between a routing node (RN) and the switch processor (SWP), "Hello" packets are exchanged. The Hello packet consists of IP header 410, LUE header 420, and a hello packet body as LUE payload 430. In addition to the normal packet format, essential information for system management and monitoring, clock synchronization, and balancing loads may be piggybacked at the trail of the Hello packet.

Figure 8:
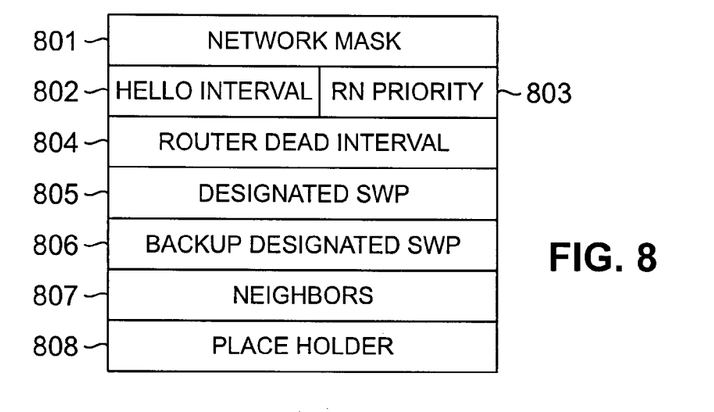
FIG. 8 is an illustration of a Hello packet body according to an exemplary embodiment of the present invention.

FIG. 8 is an illustration of a Hello packet body according to an exemplary embodiment of the present invention. The Hello packet comprises a LUE header in which Type field 422 is set to a value of 1. The Hello packet body comprises network mask field 801 (same as network mask field 451), Hello interval field 802, routing node priority field 803, router dead interval field 804, designated SWP field 805, backup designated SWP field 806, neighbors field 807, and place holder field 808

Network mask field 801 is the network mask associated with the interface. Hello interval field 802 is the number of milliseconds between consecutive Hello packets from a Designated SWP (e.g., 15 milliseconds). Hello interval field 803 in the IOP is set to 0. RN priority field 803 contains the routing node's priority and is used in (Backup) Designated router election. When the system is initialized, each routing node and SWP 255 is statically pre-assigned. LUE router daemon 320 at IOP 216 has priority of 0. LUE router daemon 330 at Designated SWP 255A has priority of 2 and LUE router daemon 340 at a backup Designated SWP 255B has a priority of 1.

Router dead interval field 804 contains the number of milliseconds before declaring a silent routing node (or IOP) non-functioning. According to an exemplary embodiment of the present invention, router dead interval field 804 is set to two times the value of Hello interval field 802 (e.g., 30 milliseconds). Designated SWP field 805 contains the identity of the Designated SWP for the network in the view of the sending IOP. The Designated SWP is identified by its IP interface address on the network. Backup designated SWP field 806 contains the identity of the Backup Designated SWP for the network in the view of the sending IOP. The Backup Designated SWP is also identified by its IP interface address on the network.

Neighbors field 807 contains the IOP ID (or SWP Id) for each IOP (or SWP) from whom valid packets have been seen recently on the network. Recently means within the time span (in seconds) in the Router dead interval field 804. The ordinary LUE router daemon 320 at IOP 216 has only two neighbors (i.e., Designated LUE router daemon 330 and Backup Designated LUE router daemon 340. Place holder field 808 is reserved for later use.

Figure 9:
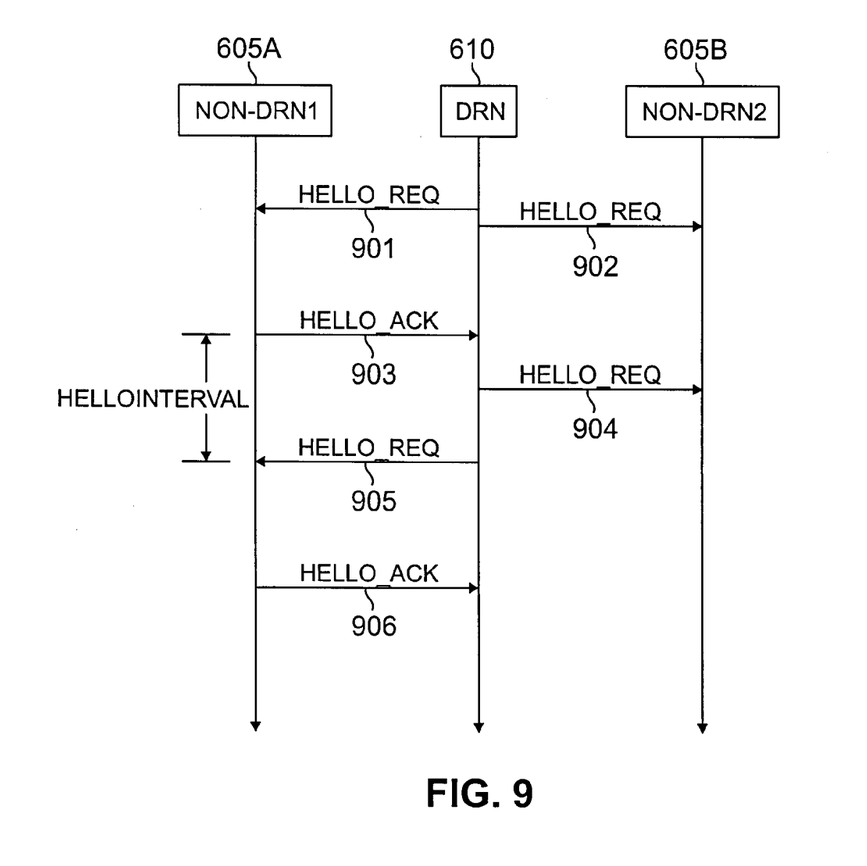
FIG. 9 is a message flow diagram of Hello message packets between a designated routing node (DRN) and non-designated routing nodes (non-DRNs) according to an exemplary embodiment of the present invention.

FIG. 9 is a message flow diagram of Hello message packets a designated routing node (DRN) and non-designated routing nodes (non-DRNs) according to an exemplary embodiment of the present invention. Each RN (or SWP) keeps a timer called the Hello timer. The Hello timer trigger after every time interval (in seconds) stored in Hello interval field 802. The HELLO INTERVAL is defined as the length of time in seconds between the transmission of consecutive Hello message packets by the RN, such as the time interval between messages 902 and 904. The HELLO INTERVAL is adjustable to be from 15 to 30 ms in the LUE router protocol.

Although an OSPF protocol has only one type of hello packet, the LUE protocol of the present invention requires two different Hello message packets: 1) a Hello_Req and 2) a Hello_Ack, which are exchanges between DRN 610 and non-DRN 605A and 605B. If DRN 610 does not receive a Hello_Ack message after sending a Hello_Req message to non-DRN 605 within finite time interval defined in router dead interval field 804, DRN 610 regards the corresponding non-DRN 605 as dead.

To reduce the number of control messages among RNS, a Hello message packet is used to piggyback system monitoring and management information for load sharing or any other application purposes.

Although the present invention has been described in detail, those skilled in the art should understand that they may make various changes, substitutions and alterations herein without departing from the spirit and scope of the invention in its broadest form.

What is claimed is:

1. A parallel router comprising:
   a plurality of routing nodes, each of said plurality of routing nodes capable of receiving message packets from and transmitting message packets to external devices, wherein said each of said plurality of routing nodes maintains a routing table suitable for routing message packets from transmitting ones of said plurality of routing nodes to receiving ones of said plurality of routing nodes; and
   a switch fabric capable of transmitting said messages packets between said transmitting nodes and said receiving nodes,
   wherein:
   a designated one of said plurality of routing nodes is operable to transmit to at least one non-designated one of said plurality of routing nodes a hello request message operable to cause said non-designated routing node to transmit back a hello acknowledgment message;
   said designated routing node monitors a time duration between transmission of said hello request message and receipt of said hello acknowledgment message to determine if said non-designated routing node has failed; and
   a first one of said plurality of routing nodes is capable of transmitting to a second one of said plurality of routing nodes a hello packet comprising information identifying said designated one of said plurality of routing nodes and a backup designated one of said plurality of routing nodes.

2. The parallel router as set forth in claim 1 wherein said designated routing node transmits an aggregated LSA message packet to said at least one non-designated routing node if said time duration does not exceed a predetermined maximum threshold.

3. The parallel router as set forth in claim 2 wherein the aggregated LSA message packet comprises a sequence number.

4. The parallel router as set forth in claim 1 wherein said designated routing node is operable to broadcast to each non-designated one of said plurality of routing nodes a hello request message operable to cause said each non-designated routing node to transmit back a hello acknowledgment message, wherein said designated routing node monitors, for said each non-designated routing node, a time duration between transmission of said hello request message and receipt of said hello acknowledgment message to determine if said each non-designated routing node has failed.

5. The parallel router as set forth in claim 4 wherein said designated routing node transmits an aggregated LSA message packet to said each non-designated routing node if said time duration does not exceed a predetermined maximum threshold.

6. The parallel router of claim 1, wherein a first one of said plurality of routing nodes is capable of transmitting to a second one of said plurality of routing nodes a hello packet comprising information regarding one of system management, clock synchronization and load balancing.

7. The parallel router of claim 1, wherein a first one of said plurality of routing nodes is capable of transmitting to a second one of said plurality of routing nodes a hello packet comprising information specifying a first time interval, wherein said designated router node transmits said hello acknowledgment messages based on said first time interval.

8. The parallel router of claim 7, wherein said hello packet further comprises information specifying a second time interval, wherein said designated router node considers a non-designated router node to have failed if said time duration between transmission of said hello request message and receipt of said hello acknowledgment message exceeds said second time interval.

9. The parallel router of claim 8, wherein said second time interval is twice as long as said first time interval.

10. The parallel router as set forth in claim 1 wherein the hello packet transmitted by the first one of said plurality of routing nodes further comprises information identifying routing nodes from which the first one of said plurality of routing nodes has recently received valid message packets.

11. A telecommunication network comprising a plurality of parallel routers capable of routing message packets between telecommunication devices coupled to said telecommunication network, each of said parallel routers comprising:
   a plurality of routing nodes, each of said plurality of routing nodes capable of receiving message packets from and transmitting message packets to external devices, wherein said each of said plurality of routing nodes maintains a routing table suitable for routing message packets from transmitting ones of said plurality of routing nodes to receiving ones of said plurality of routing nodes; and a switch fabric capable of transmitting said messages packets between said transmitting nodes and said receiving nodes, wherein:

a designated one of said plurality of routing nodes is operable to transmit to at least one non-designated one of said plurality of routing nodes a hello request message operable to cause said non-designated routing node to transmit back a hello acknowledgment message;

said designated routing node monitors a time duration between transmission of said hello request message and receipt of said hello acknowledgment message to determine if said non-designated routing node has failed; and a first one of said plurality of routing nodes is capable of transmitting to a second one of said plurality of routing nodes a hello packet comprising information identifying said designated one of said plurality of routing nodes and a backup designated one of said plurality of routing nodes.

12. The parallel router as set forth in claim 11 wherein said designated routing node transmits an aggregated LSA message packet to said at least one non-designated routing node if said time duration does not exceed a predetermined maximum threshold.

13. The parallel router as set forth in claim 11 wherein said designated routing node is operable to broadcast to each non-designated one of said plurality of routing nodes a hello request message operable to cause said each non-designated routing node to transmit back a hello acknowledgment message, wherein said designated routing node monitors, for said each non-designated routing node, a time duration between transmission of said hello request message and receipt of said hello acknowledgment message to determine if said each non-designated routing node has failed.

14. The parallel router as set forth in claim 13 wherein said designated routing node transmits an aggregated LSA message packet to said each non-designated routing node if said time duration does not exceed a predetermined maximum threshold.

15. The parallel router as set forth in claim 14 wherein the aggregated LSA message packet comprises a sequence number.

16. The telecommunication network of claim 11, wherein a first one of said plurality of routing nodes is capable of transmitting to a second one of said plurality of routing nodes a hello packet comprising information regarding one of system management, clock synchronization and load balancing.

17. The telecommunication network of claim 11, wherein a first one of said plurality of routing nodes is capable of transmitting to a second one of said plurality of routing nodes a hello packet comprising information specifying a first time interval, wherein said designated router node transmits said hello acknowledgment messages based on said first time interval.

18. The telecommunication network of claim 17, wherein said hello packet further comprises information specifying a second time interval, wherein said designated router node considers a non-designated router node to have failed if said time duration between transmission of said hello request message and receipt of said hello acknowledgment message exceeds said second time interval.

19. The telecommunication network of claim 18, wherein said second time interval is twice as long as said first time interval.

20. The parallel router as set forth in claim 11 wherein the hello packet transmitted by the first one of said plurality of routing nodes further comprises information identifying routing nodes from which the first one of said plurality of routing nodes has recently received valid message packets.

* * * * *